3,269,801
Patented August 30, 1966

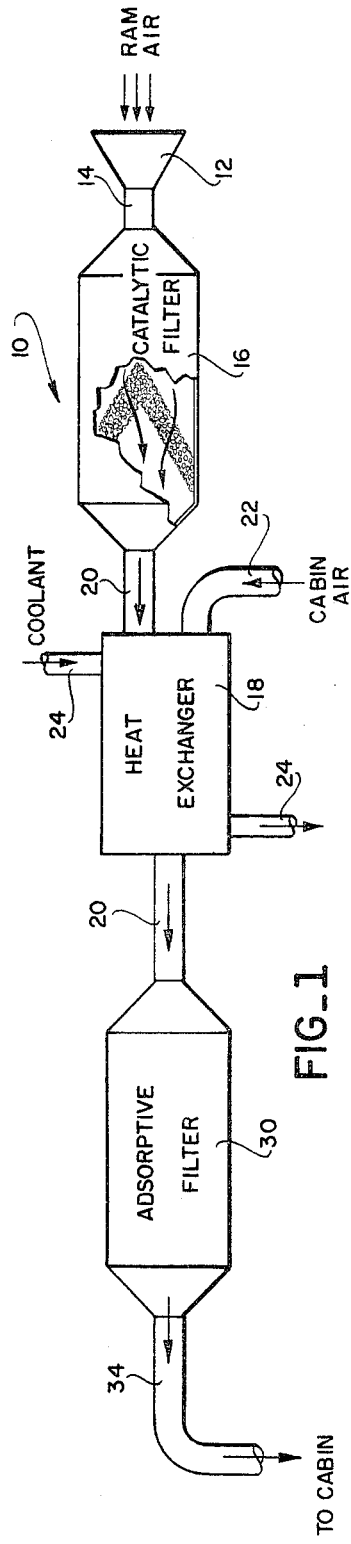
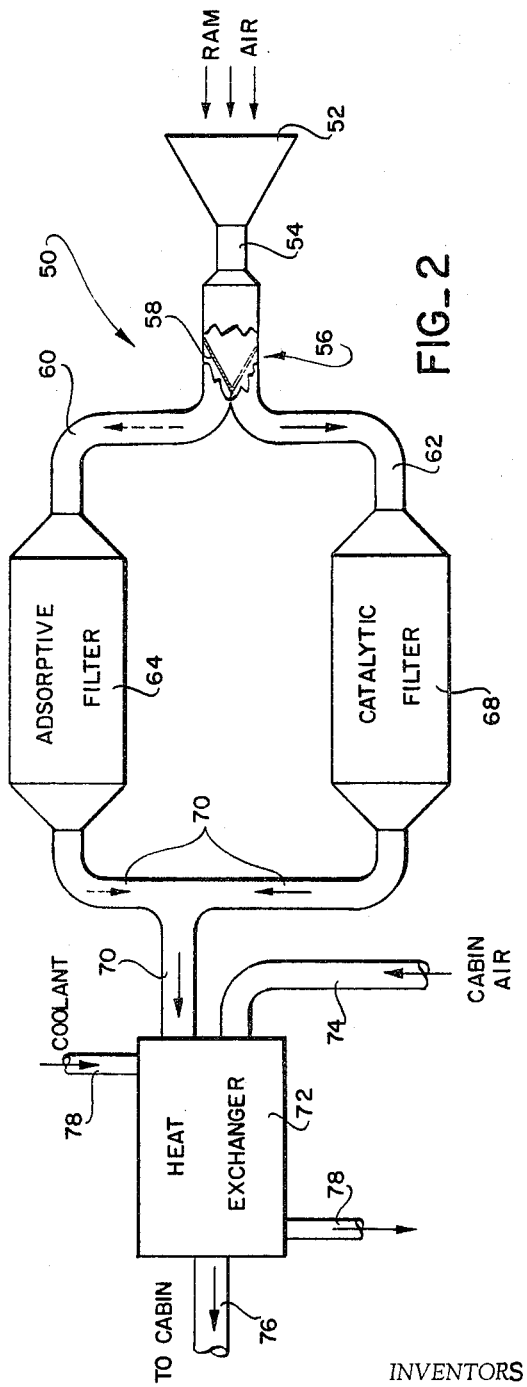

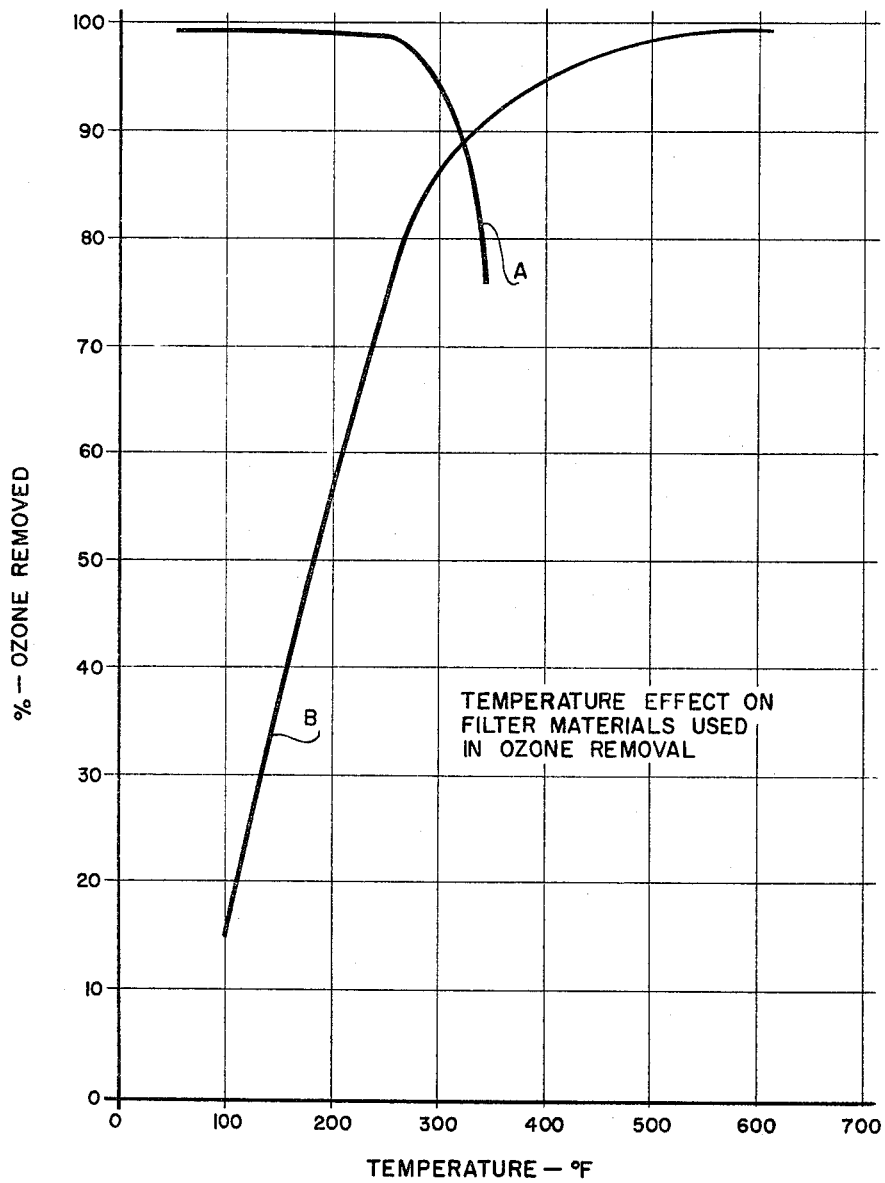
FIG_3

1

3,269,801
SYSTEMS FOR REMOVING OZONE
John E. Boberg, Northridge, and Myron Levine, Los Angeles, Calif., assignors to Lockheed Aircraft Corporation, Burbank, Calif.
Original application Oct. 20, 1961, Ser. No. 146,525. Divided and this application July 23, 1965, Ser. No. 482,977
9 Claims. (Cl. 23—238)

This application is a divisional application of Serial No. 146,525, filed October 20, 1961, now abandoned.

This invention pertains to the removal of ozone from air.

The removal of ozone from air which is used for human consumption is rapidly becoming a critical problem in the aircraft field. This is because passenger aircraft are presently being utilized and designed which are adapted to fly at extremely high altitudes. For economic reasons it is necessary to supply the passengers in such aircraft with ambient air from around such aircraft rather than to supply them with air from a compressed source of this gas mixture.

In order to supply air to aircraft passengers it has been proposed to equip aircraft with a scoop type of air inlet which, during the operation of the aircraft, "gathers up" air as the aircraft progresses, and compresses such air prior to its being conveyed from the inlet to the distribution system used in the aircraft. The air obtained in this manner is frequently referred to as "ram air." As a consequence of such compression the air supplied to the interior of an aircraft is normally heated to a material extent. With this type of system the air conveyed to the interior of an aircraft from an inlet as referred to above may be at a temperature of about 500°–600° F.

Unfortunately at relatively high altitudes the air supplied to the interior of an aircraft in the general manner referred to above is not satisfactory for human consumption for several different reasons. One of these is, of course, the temperature of such air. Another very important reason why such air cannot be consumed is the fact that it will normally contain a significant proportion of ozone, the proportion of such ozone being related to the altitude at which such air is obtained, or in other words, the altitude at which the aircraft is flying.

This may be determined by referring to published information showing the distribution of ozone at various altitudes. As an example of this, the curve identified as FIGURE 1 in Boberg and Levine's Paper No. 61-Av-2 of the American Society of Mechanical Engineers presented at the Aviation Conference of this organization at Los Angeles, California, March 12–15, 1961, shows that a maximum of about 6 p.p.m. of ozone is found in the atmosphere in an elevation of about 85,000 ft. Ozone concentrations in excess of 1 p.p.m. are normally considered to be lethal. Industrial hygienists have determined that the maximum safe or allowable concentration of ozone in air for human consumption is about 0.1 p.p.m. In general it can safely be assumed that dangerous quantities of ozone will be found in the atmosphere at elevations of from about 30,000 ft. to about 150,000 ft.

An object of the present invention is to provide means for removing ozone from the so-called ram air gathered up by an aircraft within this latter altitude range. Another object of the present invention is to provide means of this type which may be constructed at a comparatively nominal cost, which are easily utilized, and which are capable of providing prolonged, satisfactory service. A related object of the present invention is to provide new and improved catalysts for use with these means for the purpose of causing decomposition of ozone into oxygen.

2

Various other objects as well as many specific advantages of this invention will be more fully apparent from a detailed consideration of the remainder of this specification including the accompanying drawings in which:

FIGURE 1 is a diagrammatic view of an apparatus adapted to be used in an aircraft capable of flying at an altitude in the range of from 30,000–150,000 ft. for use in removing the ozone from ambient air supplied to the interior of such an aircraft;

FIGURE 2 is a diagrammatic view of a modified apparatus similar to the apparatus as set forth in the preceding figure; and FIGURE 3 is a curve showing the operation of certain materials in removing and decomposing ozone at various temperatures.

As an aid to understanding this invention it can be stated in essentially summary form that it concerns the removal of ozone from high altitude air in an aircraft through the use of a catalytic bed, an adsorptive bed and a heat exchanger. Preferably the catalytic bed is constructed so as to utilize solid strands or particles having surfaces capable of effectively decomposing ozone upon contact with this gas, these strands or particles being capable of withstanding the physical stresses and strains encountered in an aircraft and resulting from contact with so-called ram air.

The reasons for the utilization with this invention of two different types of beds for removal of ozone and of a heat exchanger will be apparent from a consideration of FIGURE 3 of the accompanying drawings. In this figure the percentage of ozone capable of being removed from air by a bed of common adsorptive agent, activated charcoal, at various temperatures is designed as curve A while the percentage of ozone capable of being removed from air by decomposition at various temperatures by a nickel wool catalyst bed is plotted as curve B. Other adsorptive and catalytic agents for the removal of ozone remove this gas from air in the same general manner indicated by these curves. Thus, the corresponding curves for these other agents are nearly the same as the curves shown. From FIGURE 3 it will be seen that the effectiveness of an adsorptive agent in removing ozone by adsorption decreases with temperature while the effectiveness of the catalyst in decomposing ozone increases with temperature. Since the temperature of ram air in an aircraft will vary depending upon the manner of aircraft operation, the altitude of flight, the amount of compression of the ram air and other factors, it will be apparent from a study of FIGURE 3 that no one type of material is capable of effective ozone removal under all conditions encountered in aircraft flights.

In accordance with this invention beds of two different types of materials for the removal of ozone may be used in series as indicated in the apparatus or system 10 shown in FIGURE 1 of the drawings. In the apparatus 10 air, labeled "ram air," from around an aircraft is picked up by an inlet scoop 12 and is compressed by the progress of the aircraft and is conveyed through a short conduit 14 to a canister 16 containing a catalytic bed (not separately shown). From this canister 16 it is conveyed to a heat exchanger 18 through another conduit 20. In the heat exchanger 18 the air from the canister 16 may be mixed with a re-cycled cabin air (air used in an aircraft) conveyed from another conduit 22, and is cooled through the use of a conventional coolant (not illustrated) supplied to and removed from the heat exchanger 18 through conduits 24. From the heat exchanger 18 the air cooled in it is passed through another conduit 28 to a canister 30 containing a bed of adsorptive material (not separately shown), and from this canister 30 it is passed into the interior of an aircraft through a further conduit 34. The canisters 16 and 30 and the heat exchanger 18 can be constructed in a number of different known manners; because of this their constructions are not set forth in this specification.

As an aircraft containing the apparatus 10 is operated ram air will be "picked up" by the scoop 12, and, by virtue of the movement of the aircraft will be compressed as it is picked up. Such compression will cause the ram air to become heated. The ram air passing into the canister 16 will come in contact with the catalytic agent within this canister 16 so as to decompose a percentage of ozone, which percentage is dependent upon the temperature of the ram air. In general, this temperature will be primarily dependent upon the speed of the aircraft. Hence, the faster the flight of the aircraft, in general, the greater the proportion of ozone in the ram air converted or decomposed to oxygen, $O_2$, in the canister 16. The temperature of the air leaving this canister 16 during the use of the apparatus 10 is lowered to a temperature at which practically all of the residual ozone remaining in it is capable of being adsorbed by the material in the canister 30 by the heat exchanger 18. Thus, with the apparatus 10, the air supplied to the interior of an aircraft through the conduit 34 will be substantially ozone free as a consequence of two different mechanisms of ozone removal which are effective at different temperatures.

Obviously the apparatus 10 will not always operate so that the two different beds of materials in the canisters 16 and 30 remove ozone precisely as indicated in the curves A and B in FIGURE 3 since the operation of these beds of materials will be dependent upon a number of factors such as, for example, the materials within these beds, the thicknesses of these beds of materials, the surface areas available for contact with ram air in these beds, the resistance to the flow of ram air exercised by these beds of materials and the like. The operation of the entire apparatus 10 should be carried under such conditions that an appropriate allowance is made for any heating effect which may be encountered by ram air passing through the various parts of this apparatus.

In general, the heat exchanger 18 should be operated so that the air conveyed through the canister 30 is cooled to a temperature at which in excess of about 90% of the ozone passing through the canister is adsorbed by the material in it. This temperature may be considered as less than about 300° F. as can be seen from an examination of curve A in FIGURE 3. In order to increase the efficiency of the operation of the catalytic material within the canister 16 preferably the entire apparatus 10 is operated so that the ram air supplied to this canister 16 is as hot as reasonably possible. In general the ram air supplied to the canister 16 should be at a temperature in excess of about 300° F. in order to accomplish as much removal or decomposition of ozone as reasonably possible in this canister 16.

A number of different materials may be used as catalysts for the decomposition of ozone within the canister 16 in the apparatus 10. Particularly favorable results in removing ozone from air at 600° F. have been achieved by utilizing fine strands of nickel wool 38 packed within a canister such as the canister 16. Other less effective catalytic materials in order of decreasing effectiveness when used in a like form under the same conditions are gold, brass, aluminum and silver. Other catalysts for the decomposition of ozone such as stainless steel, platinum, iridite aluminum and chromium are not as effective as these initially enumerated catalytic materials.

The form with which the catalytic material used in a canister such as the canister 16 is employed may be varied within comparatively wide limits. Thus, for example, metal catalysts utilized with this invention can be employed in the form of wire strands woven into screens or like structures which in turn may be located in virtually any desired type of manner so as to achieve an air flow through them. Similarly various metals used as catalysts with the present invention can be located by plating, vapor phase deposition or the like upon various inert or other supports such as finely divided glass fibers or the like. Similarly, pellets or particles of various metals, as indicated in the preceding, can be employed as catalysts, or pellets or particles of inert materials coated with catalytic agents as herein described may be utilized. If non-metallic catalysts, such as manganese dioxide are to be used in an apparatus such as the apparatus 10 to decompose ozone, pellets of such non-metallic materials may be located within the canister 16.

With the present invention it is normally preferred to utilize metallic strands of catalytic material in the canister 16 since such strands possess a relatively high amount of physical strength, are capable of withstanding the vibration encountered during the operation of an aircraft and are capable of withstanding the pressure of ram air applied to them in a canister such as the canister 16 without coming apart or decomposing in a physical sense. Thus, when strands of metal are used as catalysts in the canister 16 there is substantially no chance of the catalytic material passing from this canister 16 into the various parts of the apparatus 10.

In general, the purer the catalytic materials employed, the more efficient the ozone decomposition achieved as a consequence of their use. Further, in general, the greater the time of contact of a given amount of ram air within these materials, the greater the decomposition of ozone. Since ozone is relatively unstable at elevated temperatures the greater the duration of the time ram air containing ozone is held within various parts of the complete apparatus 10, and in particular with the conduits 14 and 20 and the canister 16, the greater the amount of ozone which will be decomposed without any catalytic effect causing such decomposition.

Time alone will, for the same reasons, cause a partial reduction in the amount of ozone passing through the canister 30 containing adsorptive material in the apparatus 10. Presently preferred results have been achieved by using as this adsorptive material particles of common activated charcoal, although other common known adsorbents may be substituted for this particular adsorbent. Similarly it is preferred to always utilize an adsorbent material such as activated charcoal which is capable of being rejuvenated in accordance with known techniques after it has become contaminated with ozone. It is considered possible that any adsorbent material used may exercise some catalytic effect in promoting the decomposition of ozone as well as an adsorbent effect. Obviously whatever adsorbent material is used in the canister 30 in the apparatus 10 it will periodically have to be replaced or rejuvenated since its effectiveness as an adsorbent for ozone will decrease depending upon the amount of ozone adsorbed by it.

In FIGURE 2 of the drawing there is shown a modified system or apparatus 50 for use in removing ozone from atmospheric air utilized in an aircraft which is closely related to the apparatus 10 previously described. In the apparatus 50 atmospheric air labelled in the drawing as "ram air" is picked up by an inlet scoop 52 as the aircraft is operated. This scoop 52 holds such air so that it is compressed and raised in temperature during flight. From the scoop 52 this ram air is conveyed through a short conduit 54 to a valve 56 having a movable valve body 58 which is capable of being actuated so as to direct the ram air into either a conduit 60 or a conduit 62.

When the ram air is passed through the conduit 60 it is directed into a canister 64 corresponding to the canister 30 previously described. This canister 64 may be filled with an adsorptive material as indicated in the preceding discussion. When the ram air is directed into the conduit 62 it passes into a canister 68 corresponding to the canister 16 previously described where it passes in engagement with the surface of a catalytic material of the type indicated in the preceding discussion which is capable of decomposing ozone by contact with this gas.

The outlets from the canisters 64 and 68 are connected together by means of further conduits 70 which lead to a heat exchanger 72 corresponding to the heat exchanger 18 previously described. In this heat exchanger 72 the ram air may be mixed with recirculated cabin air conveyed to the exchanger 72 through a conduit 74 before it is supplied to the interior of an aircraft at a useful temperature, capable of being tolerated by a human being, through a further conduit 76. Conduits 78 are used to supply to and remove from the heat exchanger 72 a coolant fluid (not separately shown).

From a consideration of the apparatus 50 it will be realized that the canisters 64 and 68 are connected in parallel, whereas in the apparatus 10 the canisters 16 and 30 are connected in series with one another. With the apparatus 50 the valve 56 is normally operated so as to direct ram air at temperatures of less than about 300° F. through the canister 64 and so as to direct ram air at greater temperatures than this through the canister 68. With this mode of operation the materials within the canisters 64 and 68 are used within the temperature ranges in which they most effectively remove ozone.

This specification is based upon invention subject matter set forth in the Boberg and Levine Paper Number 61-Av-2 of the American Society of Mechanical Engineers referred to earlier in this specification. For the purposes of brevity material set forth in this paper which is not considered necessary for an understanding of the present invention has been omitted from this specification. However, the entire contents of this Paper 61-Av-2 are incorporated herein by reference for the purpose of amplifying the disclosure of this specification.

It is to be understood that the foregoing description is by way of illustration, and that changes, omissions, additions, substitutions and/or modifications may be made within the scope of the claims without departing from the spirit of the invention.

What is claimed is:

1. An apparatus for removing ozone from air entering an aircraft cabin comprising: means for admitting ram air; means for catalytically decomposing the ozone in said air connected to the ram air admitting means; heat exchanger means for cooling air connected to said means for catalytically decomposing ozone so as to receive air from said means for catalytically decomposing ozone; means for ducting recycled cabin air into the heat exchanger means; and means for adsorbing ozone from air connected to said heat exchanger means so as to receive air from said heat exchanger means.

2. An apparatus as defined in claim 1 wherein said means for catalytically decomposing ozone comprises: canister means, and metal strands having surfaces capable of decomposing ozone located within said canister means.

3. An apparatus as defined in claim 2 wherein said metal strands are nickel strands.

4. An apparatus as defined in claim 1 wherein said means for adsorbing ozone comprises: canister means and activated charcoal particles located within said canister means.

5. An apparatus for removing ozone from atmospheric air entering an aircraft cabin comprising: a ram air inlet means for obtaining air from the atmosphere; valve means connected to said air inlet means so as to receive air from said air inlet means; means for catalytically decomposing ozone connected to said valve means; means for adsorbing ozone in air connected to said valve means, said valve means directing air into either said means for catalytically decomposing ozone or said means for adsorbing ozone; and a heat exchanger being coupled to the ozone decomposing means and ozone adsorbing means.

6. An apparatus as defined in claim 5 wherein said means for catalytically decomposing ozone comprises: canister means, and metal strands having surfaces capable of decomposing ozone located within said canister means.

7. An apparatus as defined in claim 6 wherein said metal strands are nickel strands.

8. An apparatus as defined in claim 5 wherein said means for adsorbing ozone comprises: canister means and activated charcoal particles located within said canister means.

9. An apparatus as defined in claim 5 wherein said means for decomposing ozone comprises: canister means, and manganese dioxide pellets located within said canister means.

References Cited by the Examiner

UNITED STATES PATENTS

| 1,961,878 | 6/1934 | Gilkey | 23—4 |
|---|---|---|---|
| 2,872,397 | 2/1959 | Kiffer | 23—281 X |
| 2,980,494 | 4/1961 | Jenkins et al. | 23—4 |
| 3,151,943 | 10/1964 | Fujimoto et al. | 23—222 X |

OTHER REFERENCES

Rideal, "Ozone," page 135 (1920), Constable and Co. Ltd., London.

MORRIS O. WOLK, *Primary Examiner.*

JOSEPH SCOVRONEK, *Examiner.*